(12) United States Patent
Su et al.

(10) Patent No.: US 9,697,866 B2
(45) Date of Patent: Jul. 4, 2017

(54) DEVICE AND METHOD FOR MEASURING PITCH AND ROLL TORQUES

(71) Applicant: MMI HOLDINGS LIMITED

(72) Inventors: Steven Su, Boulder, CO (US); Cheng Le Wei, Singapore (SG)

(73) Assignee: MMI HOLDINGS LIMITED, Singapore (SG)

(*) Notice: Subject to any disclaimer, the term of this patent is extended or adjusted under 35 U.S.C. 154(b) by 0 days.

(21) Appl. No.: 15/170,198

(22) Filed: Jun. 1, 2016

(65) Prior Publication Data

US 2017/0110148 A1   Apr. 20, 2017

(30) Foreign Application Priority Data

Oct. 14, 2015  (SG) .............................. 10201508505T

(51) Int. Cl.
  *G11B 5/55*  (2006.01)
  *G11B 19/04*  (2006.01)
(52) U.S. Cl.
  CPC ................................. *G11B 19/048* (2013.01)

(58) Field of Classification Search
  None
  See application file for complete search history.

(56) References Cited

U.S. PATENT DOCUMENTS 7,106,552 B2 * 9/2006 Hirano ................. G11B 5/5552
                                                    360/78.05

* cited by examiner

*Primary Examiner* — K. Wong
(74) *Attorney, Agent, or Firm* — Roberts Mlotkowski Safran Cole & Calderon, P.C.

(57) ABSTRACT

Embodiments of the invention provide a device for measuring pitch and roll torques. The device comprises a sensor plate having a horizontal cross member, a vertical cross member and a surrounding member connecting ends of the horizontal and vertical cross members, wherein the horizontal cross member and the vertical cross member intersect each other at a centre region of the sensor plate; a VCM coil attached to the sensor plate and configured to generate a pitch and a roll torque when an electrical current is applied to the VCM coil; a first strain gauge attached to a surface of the horizontal cross member and configured to detect a horizontal strain caused by the pitch and roll torques; and a second strain gauge attached to a surface of the vertical cross member and configured to detect a vertical strain caused by the pitch and roll torques.

18 Claims, 6 Drawing Sheets

DEVICE AND METHOD FOR MEASURING PITCH AND ROLL TORQUES

FIELD OF INVENTION

The invention relates generally to a device and method for measuring pitch and roll torques of a hard disk drive (HDD) voice coil motor (VCM).

BACKGROUND

There are three types of torques produced in a HDD VCM, namely, yaw, pitch and roll torques, as shown in FIG. 1. Yaw torque produces useful work and is the intended mechanical output of the VCM, whereas pitch and roll torques are undesired by-products which can cause serious resonance issues. These resonances can result in HDD failure.

In order to limit the number and magnitude of the resonances, it is useful to quantify the pitch and roll torques. Commercially available three axis load cells, while conceptually possible, have not been successful measuring pitch and roll torques in a HDD VCM. Two issues prevent its use. Firstly, the resolution is not adequate to accurately measure these small pitch and roll torques. Secondly, sensors used by the three axis load cell require that the yaw torque does not exceed several times of the pitch and roll torques. If this condition is not satisfied, the high yaw torque will corrupt the low pitch and roll torques, thus resulting in non-accurate measurement of the pitch and roll torques.

SUMMARY OF INVENTION

Embodiments of the invention provide a solution for accurately measuring pitch and roll torques.

According to one aspect of the invention, a device for measuring pitch and roll torques of a hard disk drive (HDD) voice coil motor (VCM) is provided. The device comprises:

a sensor plate having a horizontal cross member, a vertical cross member and a surrounding member connecting ends of the horizontal member and the vertical member, wherein the horizontal cross member and the vertical cross member intersect each other at a centre region of the sensor plate;

a VCM coil attached to the sensor plate and configured to generate a pitch torque and a roll torque when an electrical current is applied to the VCM coil;

a first strain gauge attached to a surface of the horizontal cross member and configured to detect a horizontal strain caused by the pitch and roll torques generated by the VCM coil; and a second strain gauge attached to a surface of the vertical cross member and configured to detect a vertical strain caused by the pitch and roll torques generated by the VCM coil.

In one embodiment, the pitch torque and the roll torque produced by the VCM coil can be calculated based on a reading of the detected horizontal strain and a reading of the detected vertical strain respectively taken from the first strain gauge and the second strain gauge.

In one embodiment, the device further comprises a first calibrating element configured to determine a first constant value defining a ratio of horizontal strain value to a pitch force, and a second constant value defining a ratio of vertical strain value to a pitch force, a second calibrating element configured to determine a third constant value defining a ratio of horizontal strain value to a roll force, and a fourth constant value defining a ration of vertical strain value to a roll force, wherein the pitch torque and the roll torque are calculated further based on the first, second, third and fourth constant values.

According to one embodiment, in order to determine the first constant value and the second constant value, a load cell is attached to the VCM coil to apply a predetermined pitch load to the sensor plate.

According to one embodiment, in order to determine the third constant value and the fourth constant value, two load cells are attached to the sensor plate to apply a predetermined roll load to the sensor plate.

In order to accurately measure the output signal of the strain gauges, preferably, each of the first strain gauge and the second strain gauge is wired to a Wheatstone bridge circuit.

In embodiments of the invention, the surrounding member of the sensor plate may have one of an elliptical shape, a circular shape, and a rectangular shape.

According to a second aspect of the invention, a method for measuring pitch and roll torques of a hard disk drive (HDD) voice coil motor (VCM) is provided. The method comprises:

providing a sensor plate having a horizontal cross member, a vertical cross member and a surrounding member connecting ends of the horizontal member and the vertical member, wherein the horizontal cross member and the vertical cross member intersects each other at a centre region of the sensor plate, wherein a VCM coil is attached to the sensor plate, wherein a first strain gauge is attached to a surface of the horizontal cross member, wherein a second strain gauge is attached to a surface of the vertical cross member;

using the VCM coil, generating a pitch torque and a roll torque;

using the first strain gauge, detecting a horizontal strain in the horizontal cross member, which is caused by the pitch and roll torques generated by the VCM coil; and using the second strain gauge, detecting a vertical strain in the vertical cross member, which is caused by the pitch and roll torques generated by the VCM coil.

In one embodiment, the pitch torque and the roll torque are calculated based on a reading of the detected horizontal strain and a reading of the detected vertical strain respectively taken from the first strain gauge and the second strain gauge.

In one embodiment, the method further comprises the following calibration steps:

calibrating, by a first calibrating element, the sensor plate to determine a first constant value defining a ratio of horizontal strain value to a pitch force, and a second constant value defining a ratio of vertical strain value to a pitch force;

calibrating, by a second calibrating element, the sensor plate to determine a third constant value defining a ratio of horizontal strain value to a roll force, and a fourth constant value defining a ratio of vertical strain value to a roll force, wherein the pitch torque and the roll torque are calculated based on the detected pitch strain and roll strain, and the first, second, third and fourth constant values.

In order to determine the first constant value and the second constant value, in one example, the first calibrating element includes a predetermined load cell, wherein the step of calibrating, by a first calibrating element, the sensor plate to determine the first constant value and the second constant value comprises:

attaching the load cell to the VCM coil and applying a predetermined pitch load to the sensor plate;

moving a position of the load cell perpendicular to the sensor plate to obtain more than one pair of vertical strain value and horizontal strain value corresponding to more than one pitch force value, wherein the vertical strain value and horizontal strain value are read from the second strain gauge and the first strain gauge respectively; and determining the first constant value and the second constant value based on the more than one pitch force value and more than one pair of vertical strain value and horizontal strain value.

In order to determine the third constant value and the fourth constant value, in one example, the second calibrating element includes two load cells attached to the sensor plate, wherein the step of calibrating, by the second calibrating element, the sensor plate to determine the third constant value and the fourth constant value comprises:

attaching the two load cells to the sensor plate and applying a predetermined roll load to the sensor plate;

moving a position of the two load cells relative to the sensor plate to obtain more than one pair of vertical strain value and horizontal strain value corresponding to more than one roll force value, wherein the vertical strain value and horizontal strain value are read from the second strain gauge and the first strain gauge; and determining the third constant value and the fourth constant value based on the more than one roll force value and more than one pair of vertical strain value and horizontal strain value.

The device for measuring pitch and roll torques disclosed in embodiments of the invention has a unique semi-rigid structure that is very stiff and insensitive to yaw torques but sensitive to pitch and roll torques. This unique semi-rigid structure eliminates cross-talk between yaw/pitch and yaw/roll signals which conventional three axis load cells are prone to if certain load ratios are exceeded as previously described. The fabrication cost of the device is low since it can be produced using common materials and conventional manufacturing techniques. These qualities make the design highly desirable and unique over any solution in the industry.

BRIEF DESCRIPTION OF THE DRAWINGS

FIG. 3(b) shows the positional relationship between the coil of the sensor plate and the magnet of the VCM in the system shown in FIG. 3(a).

DETAILED DESCRIPTION OF EMBODIMENTS OF THE INVENTION

Figure 1:
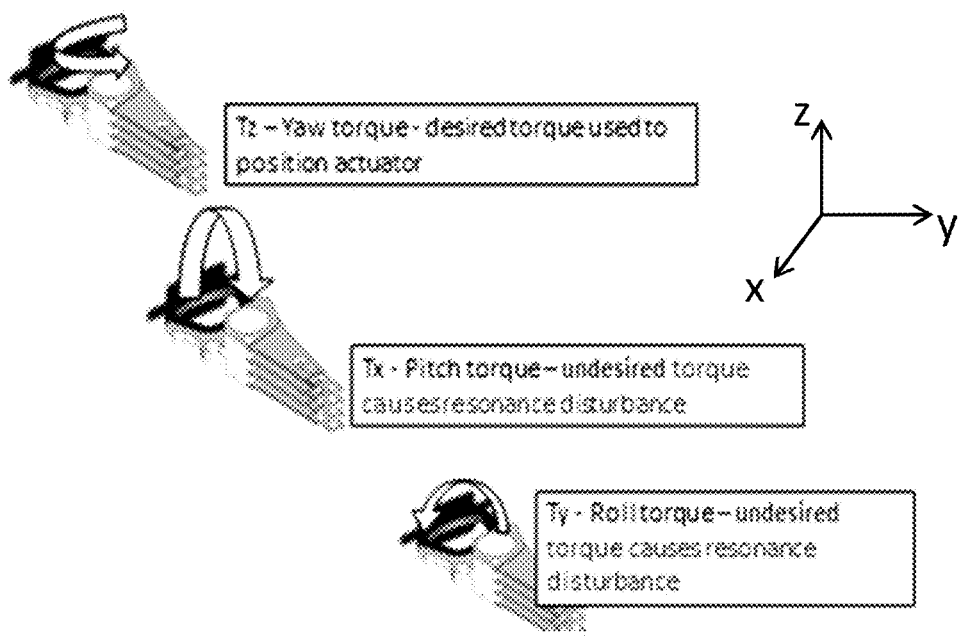
FIG. 1 shows yaw, pitch and roll torques produced in a HDD VCM.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

Figure 2:
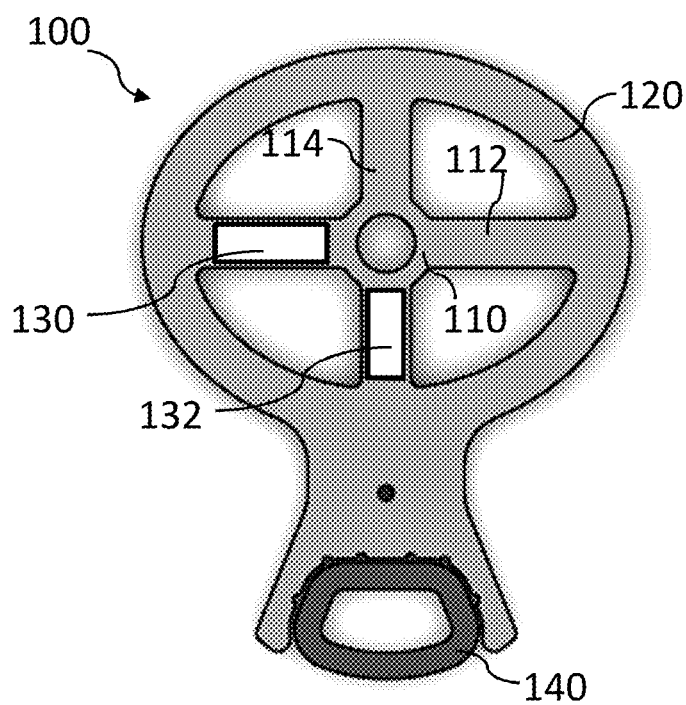
FIG. 2 is a plan view of the device for measuring pitch and roll torques according to one embodiment of the invention.

According to one embodiment of the invention, referring to FIG. 2, the device 100 for measuring pitch and roll torques comprises a sensor plate 110, a horizontal strain gauge 130, a vertical strain gauge 132 attached to the sensor plate 110, and a VCM coil 140 which is attached to the sensor plate 110.

Typically, the sensor plate 110 is made of metal. Referring to FIG. 2, the sensor plate 110 has a horizontal cross member 112 and a vertical cross member 114, and a surrounding member 120 connecting ends of the horizontal cross member 112 and the vertical cross member 114. The horizontal cross member 112 and the vertical cross member 114 intersect each other at a centre region of the sensor plate 110. In this embodiment, the surrounding member 120 has an elliptical shape. It is to be appreciated that the surrounding member may have any shape, e.g. a circular or rectangular shape, in other embodiments. The horizontal and vertical cross members 112, 114 are configured to detect roll and pitch strains respectively by bonding strain gauges 130, 132 directly on the surface of the members 112, 114. Strain gauges 130, 132 are mechanical transducers which output voltage when mechanical deformation is present in a material. In this example, one strain gauge 130 is placed on the horizontal member 112 and another strain gauge 132 is placed on the vertical member 114. Furthermore, to accurately measure the output signal, each of the strain gauges 130, 132 are wired to a Wheatstone Bridge circuit (not shown in FIG. 2). The Wheatstone Bridge circuit will not be described in detail here since this is common practice in strain gauge application and well known to a person skilled in the art. In this embodiment, a quarter-Wheatstone bridge is described however half and full-bridge configurations may also be used by incorporating additional strain gauges onto the horizontal and vertical members. The decision to use quarter, half or full Wheatstone bridge is based on the user's application and is not necessarily a component of this invention. In this embodiment, the strain gauges 130 and 132 may be attached to the surface of the cross members 112, 114 by adhesion e.g. glue, or by any other suitable method.

The VCM coil 140 is attached to the sensor plate 110 with a bonding agent like epoxy. The VCM coil 140 generates forces for producing the pitch, roll and yaw torques. The torques are produced when the VCM coil 140 is inserted into a VCM magnetic field and an electrical current is applied. In this embodiment, the horizontal strain gauge 130 responds almost exclusively to roll torque and therefore the horizontal strain gauge 130 is not influenced significantly by yaw and pitch torques. Similarly, the vertical strain gauge 132 responds almost exclusively to pitch torques and therefore the vertical strain gauge 132 is not influenced significantly by yaw and roll torques. This helps simplify the calculations and reduces the possibility of signal cross talk.

Figure 3:
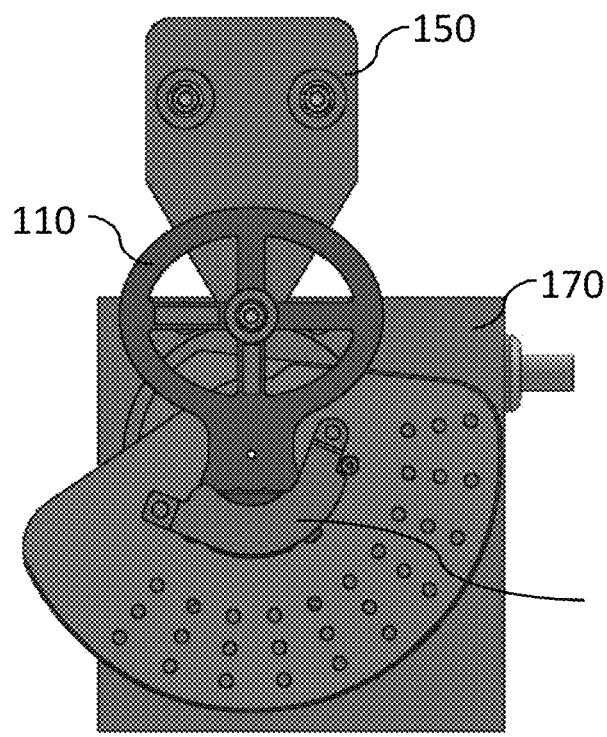
FIG. 3 (a) is a plan view of a system for measuring pitch and roll torques using the device in FIG. 2.
Figure 3:
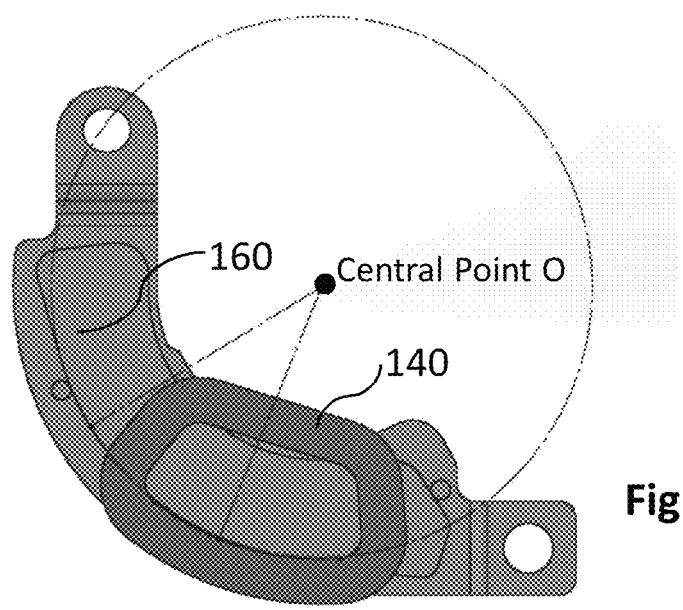

According to one embodiment of the invention, when the device 100 is used to measure pitch and roll torques, the strain gauges 130 and 132 are respectively attached to the surface of the horizontal and vertical cross members 112 and 114 of the sensor plate 110. Then, the sensor plate 110 is fixed at its centre region by a clamp to a stationary positioning block 150 as shown in FIG. 3 (*a*). The VCM 160 is attached to a fixture on a rotational motor 170. The rotational motor 170 allows the VCM 160 to rotate while the sensor plate 110 remains stationary so that pitch and roll torques can be measured throughout its normal operating range as in a functioning HDD. Referring to FIG. 3(*b*), the sensor plate 110 and VCM 160 are positioned such that the VCM coil 140 and the magnet of the VCM 160 share a common rotation point or axis as they would be in normal operation of a functional HDD.

When an electrical current is applied to the VCM coil 140, a pitch torque and a roll torque will be generated. The generated pitch and roll torques can be calculated based on the readings respectively taken from the strain gauges 130 and 132. Specifically, by using the horizontal strain gauge 130, a horizontal strain in the horizontal cross member and resulting from the generated pitch and roll torques is detected and ascertained; by using the vertical strain gauge 132, a vertical strain in the vertical cross member and resulting from the generated pitch and roll torques is detected and ascertained.

According to one embodiment of the invention, before using the device 100 to measure pitch and roll torques, the sensor plate 110 is to be calibrated to determine parameters used for calculating the pitch and roll torques. The parameters may include a first constant value defining a ratio of horizontal strain to pitch force, a second constant value defining a ratio of vertical strain to pitch force, a third constant value defining a ratio of horizontal strain to roll force, and a fourth constant value defining a ratio of vertical strain value to roll force. Accordingly, the pitch torque and the roll torque are calculated based on the detected pitch and roll strain values, as well as the first, second, third and fourth constant values.

Figure 4:
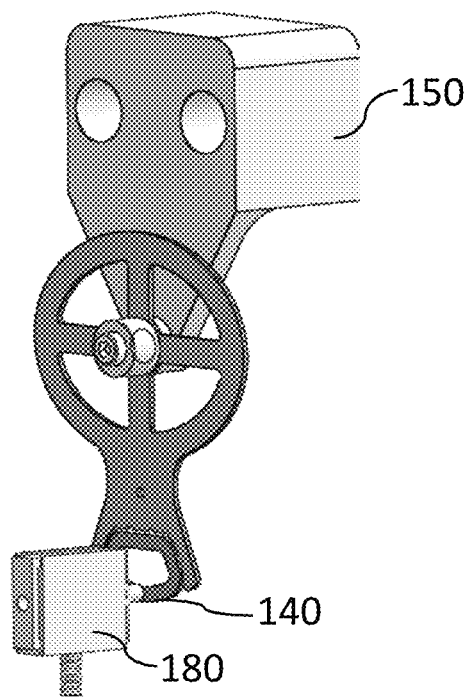
FIG. 4 is a perspective view of a system for calibrating the device shown in FIG. 2 to determine constants associated with calculation of pitch torque.
Figure 5:
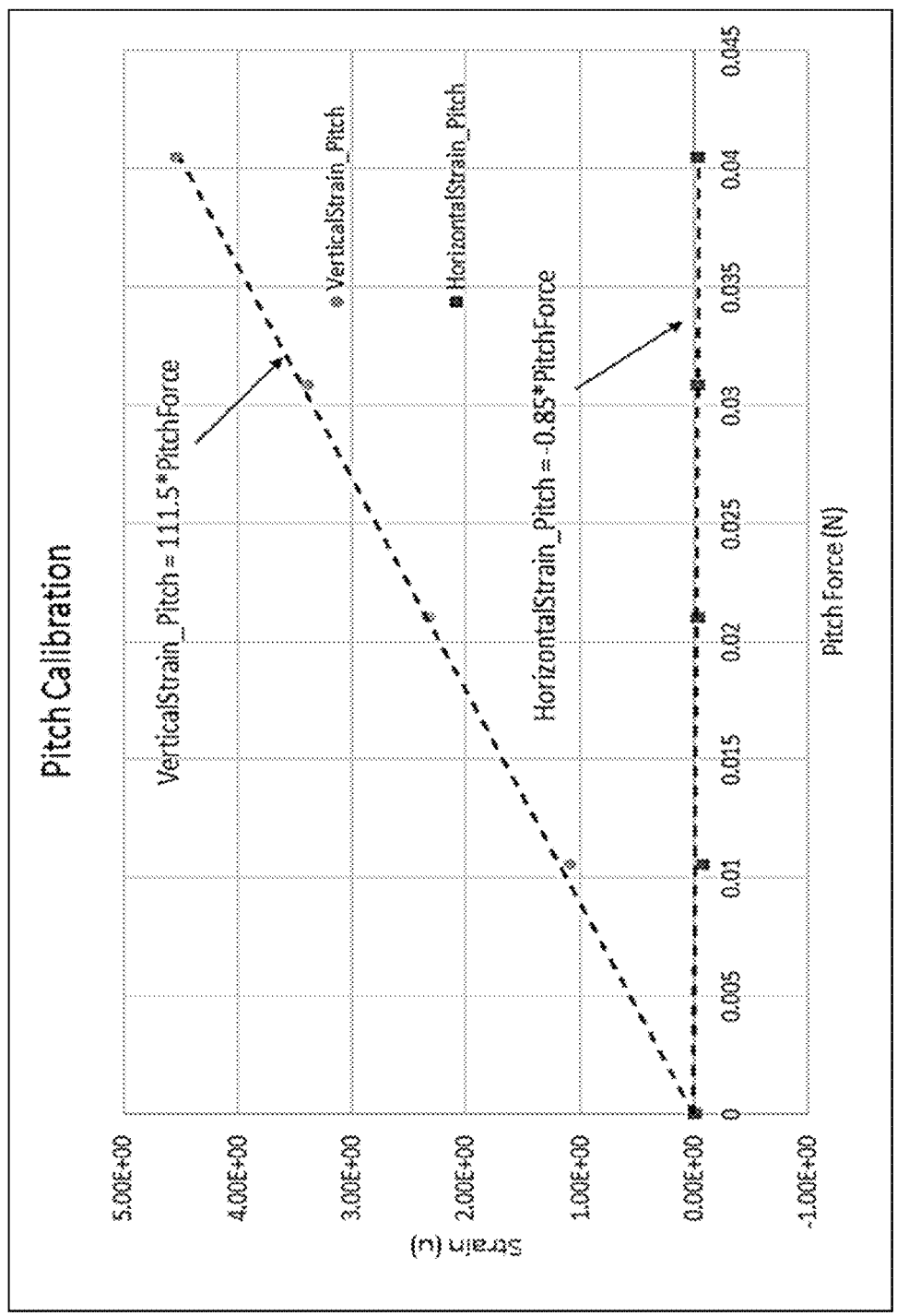
FIG. 5 shows the calibration curves obtained by using the system shown in FIG. 4.

To calibrate the sensor plate 110, predetermined pitch and roll loads are applied separately to the sensor plate 110 and the corresponding strains are recorded through the strain gauges 130 and 132. During this process, the VCM 160 is removed from the device 100. In one example, to calibrate the sensor plate 110 to pitch torque, a first calibrating element, including a load cell 180, is attached to the VCM coil 140 to apply a known/predetermined pitch load onto the sensor plate 110 as shown in FIG. 4. By moving the position of the load cell 180 perpendicular to the sensor plate 110 (see FIG. 4), the pitch force applied on the VCM coil 140 can be changed and the corresponding strain will be recorded by both vertical and horizontal strain gauges 130 and 132. By plotting the relation between pitch load/force and horizontal strain and the relation between pitch load/force and vertical strain, two linear calibration lines can be constructed. (By linear regression, two best fit lines can be obtained (See VerticalStrain_Pitch and HorizontalStrain_Pitch in FIG. 5). A first constant value and a second constant value, Kph and Kpv in the equations below are the slopes of the two best fit lines. Thus two equations can be written as shown below.

$$\text{HorizontalStrain\_Pitch} = Kph * \text{Pitch Force} \quad (1)$$

$$\text{VerticalStrain\_Pitch} = Kpv * \text{Pitch Force} \quad (2)$$

Figure 6:
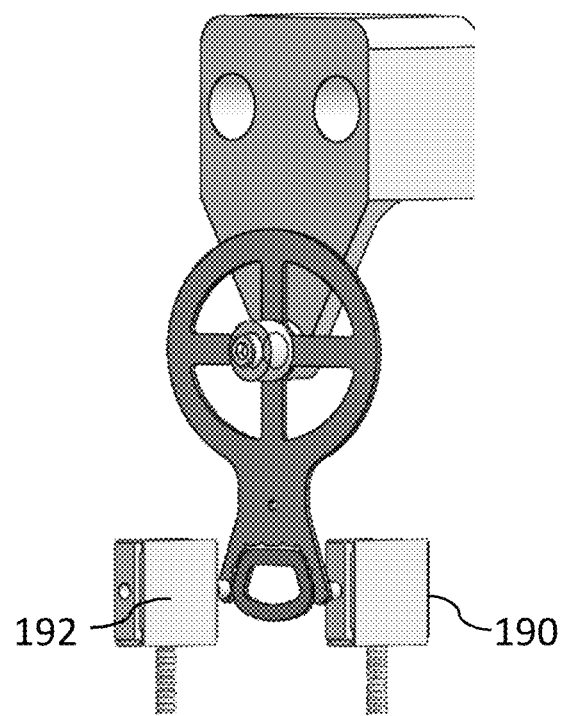
FIG. 6 is a perspective view of a system for calibrating the device shown in FIG. 2 to determine constants associated with calculation of roll torque.

Similarly, calibration curves need to be constructed for roll torque. The difference is that a second calibrating element, including two load cells 190 and 192, is required to produce a known/predetermined roll load as shown in FIG. 6. By a similar process, known roll loads are applied to the sensor plate 110 and the corresponding strains are recorded by both vertical and horizontal strain gauges 130 and 132.

Figure 7:
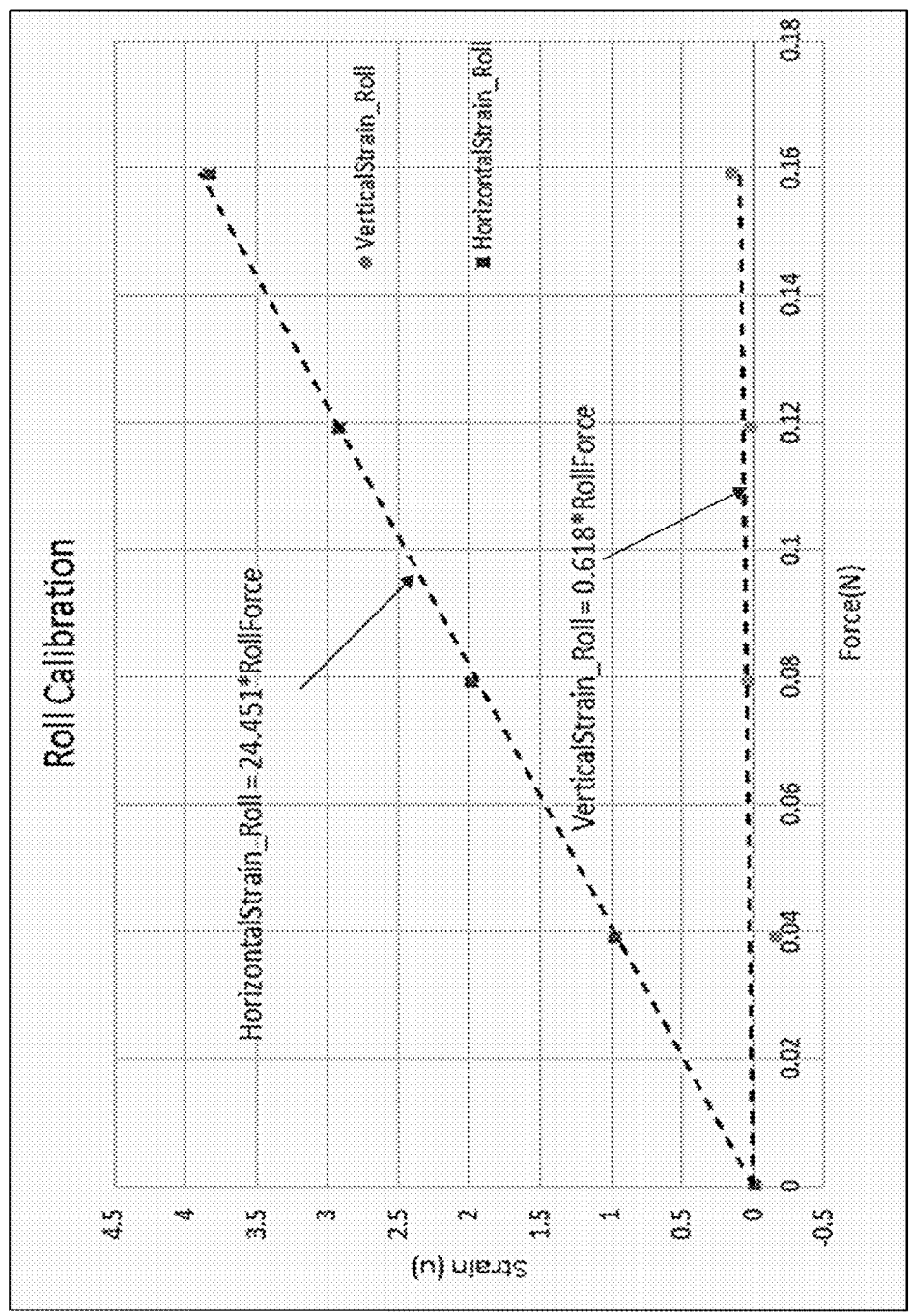
FIG. 7 shows the calibration curves obtained by using the system shown in FIG. 6.

By plotting the relation between roll load/force and horizontal strain and the relation between roll load/force and vertical strain, two linear calibration lines can be constructed. By linear regression, two best fit lines can be obtained (See VerticalStrain_Roll and HorizontalStrain_Roll in FIG. 7). A third constant value and a fourth constant value, Krh and Krv, in the equations below are the slopes of the two best fit lines. Thus two equations can be written as shown below.

$$\text{HorizontalStrain\_Roll} = Krh * \text{RollForce} \quad (3)$$

$$\text{VerticalStrain\_Roll} = Krv * \text{RollForce} \quad (4)$$

The total strain is due to both the pitch and roll torques where the following applies:

$$\text{Total strain vertical} = \text{VerticalStrain\_Pitch} + \text{VerticalStrain\_Roll} \quad (5)$$
$$= Kpv * \text{PitchForce} + Krv * \text{RollForce}$$

$$\text{Total strain horizontal} = \text{HorizontalStrain\_Pitch} + \quad (6)$$
$$\text{HorizontalStrain\_Roll}$$
$$= Kph * \text{PitchForce} + Krh * \text{RollForce}$$

When the device 100 is used to measure pitch and roll torques, the total strain vertical can be obtained by the reading of the vertical strain gauge 130 and the total strain horizontal can be obtained by the reading of the horizontal strain gauge 132, then the Pitch Force and Roll Force can be calculated based on the two equations (5) and (6). Accordingly, the pitch torque and roll torque can be calculated based on the Pitch Force and Roll Force and the corresponding length of the arm of force.

Since the sensor plate is symmetric, the calibration process only has to be performed once for pitch and once for roll. This greatly simplifies the calculations to determine pitch and roll torques.

Other embodiments will be apparent to those skilled in the art from consideration of the specification and practice of the invention. Furthermore, certain terminology has been used for the purposes of descriptive clarity, and not to limit the disclosed embodiments of the invention. The embodiments and features described above should be considered exemplary.

The invention claimed is:

1. A device for measuring pitch and roll torques of a hard disk drive (HDD) voice coil motor (VCM), the device comprising:
   a sensor plate having a horizontal cross member, a vertical cross member and a surrounding member connecting ends of the horizontal member and the vertical member, wherein the horizontal cross member and the vertical cross member intersect each other at a centre region of the sensor plate;
   a VCM coil attached to the sensor plate and configured to generate a pitch torque and a roll torque when an electrical current is applied to the VCM coil;
   a first strain gauge attached to a surface of the horizontal cross member and configured to detect a horizontal strain caused by the pitch and roll torques generated by the VCM coil; and
   a second strain gauge attached to a surface of the vertical cross member and configured to detect a vertical strain caused by the pitch and roll torques generated by the VCM coil.

2. The device according to claim 1, wherein the pitch torque and the roll torque are calculated based on a reading of the detected horizontal strain and a reading of the detected vertical strain respectively taken from the first strain gauge and the second strain gauge.

3. The device according to claim 2, further comprising:
a first calibrating element configured to determine a first constant value defining a ratio of horizontal strain to pitch force, and a second constant defining a ratio of vertical strain to pitch force,
a second calibrating element configured to determine a third constant value defining a ratio of horizontal strain to roll force, and a fourth constant value defining a ratio of vertical strain to roll force,
wherein the pitch torque and the roll torque are calculated further based on the first, second, third and fourth constant values.

4. The device according to claim 3, wherein the first calibrating element includes:
a load cell attached to the VCM coil and configured to apply a predetermined pitch load to the sensor plate to determine the first constant value and the second constant value.

5. The device according to claim 4, wherein the second calibrating element includes:
two load cells attached to the sensor plate and configured to apply a predetermined roll load to the sensor plate to determine the third constant value and the fourth constant value.

6. The device according to claim 1, wherein each of the first strain gauge and the second strain gauge is wired to a Wheatstone bridge circuit.

7. The device according to claim 1, wherein the surrounding member of the sensor plate has one of an elliptical shape, a circular shape, and a rectangular shape.

8. The device according to claim 1, wherein the first strain gauge and the second strain gauge are attached to the sensor plate by adhesion.

9. The device according to claim 1, wherein the VCM coil is attached to the sensor plate with a bonding agent.

10. A method for measuring pitch and roll torques of a hard disk drive (HDD) voice coil motor (VCM), the method comprising:
providing a sensor plate having a horizontal cross member, a vertical cross member and a surrounding member connecting ends of the horizontal member and the vertical member, wherein the horizontal cross member and the vertical cross member intersects each other at a centre region of the sensor plate, wherein a VCM coil is attached to the sensor plate, wherein a first strain gauge is attached to a surface of the horizontal cross member, wherein a second strain gauge is attached to a surface of the vertical cross member;
using the VCM coil, generating a pitch torque and a roll torque;
using the first strain gauge, detecting a horizontal strain in the horizontal cross member, which is caused by the pitch and roll torques generated by the VCM coil; and
using the second strain gauge, detecting a vertical strain in the vertical cross member, which is caused by the pitch and roll torques generated by the VCM coil.

11. The method according to claim 10, further comprising:
calculating the pitch torque and the roll torque based on a reading of the detected horizontal strain and a reading of the detected vertical strain respectively taken from the first strain gauge and the second strain gauge.

12. The method according to claim 11, further comprising:
calibrating, by a first calibrating element, the sensor plate to determine a first constant value defining a ratio of horizontal strain to pitch force, and a second constant value defining a ratio of vertical strain to pitch force;
calibrating, by a second calibrating element, the sensor plate to determine a third constant value defining a ratio of horizontal strain to roll force, and a fourth constant value defining a ratio of vertical strain to roll force,
wherein calculating the pitch torque and the roll torque further includes:
calculating the pitch torque and the roll torque further based on the first, second, third and fourth constant values.

13. The method according to claim 12, wherein the first calibrating element includes a load cell,
wherein the step of calibrating, by a first calibrating element, the sensor plate to determine the first constant value and the second constant value comprises:
attaching the load cell to the VCM coil and applying a predetermined pitch load to the sensor plate;
moving a position of the load cell perpendicular to the sensor plate to obtain more than one pair of vertical strain value and horizontal strain value corresponding to more than one pitch force value, wherein the vertical strain value and horizontal strain value are read from the second strain gauge and the first strain gauge respectively;
determining the first constant value and the second constant value based on the more than one pitch force value and more than one pair of vertical strain value and horizontal strain value.

14. The method according to claim 13, wherein the second calibrating element includes two load cells attached to the sensor plate,
wherein the step of calibrating, by a second calibrating element, the sensor plate to determine the third constant value and the fourth constant value comprises:
attaching the two load cells to the sensor plate and applying a predetermined roll load to the sensor plate;
moving a position of the two load cells relative to the sensor plate to obtain more than one pair of vertical strain value and horizontal strain value corresponding to more than one roll force value, wherein the vertical strain value and horizontal strain value are read from the second strain gauge and the first strain gauge;
determining the third constant value and the fourth constant value based on the more than one roll force value and more than one pair of vertical strain value and horizontal strain value.

15. The method according to claim 10, wherein each of the first strain gauge and the second strain gauge is wired to a Wheatstone bridge circuit.

16. The method according to claim 10, wherein the surrounding member of the sensor plate has one of an elliptical shape, a circular shape, and a rectangular shape.

17. The method according to claim 10, wherein the first strain gauge and the second strain gauge are bonded to the sensor plate by adhesion.

18. The method according to claim 10, wherein the VCM coil is attached to the sensor plate with a bonding agent.

* * * * *